Nov. 8, 1938. V. D. DAVIGNON 2,135,800

FLEXIBLE WIRE

Filed May 23, 1936

Victor D. Davignon,
Inventor,
Delos F. Haynes,
Attorney.

Patented Nov. 8, 1938

2,135,800

UNITED STATES PATENT OFFICE 2,135,800

FLEXIBLE WIRE

Victor D. Davignon, North Attleboro, Mass., assignor, by mesne assignments, to Metals & Controls Corporation, Attleboro, Mass., a corporation of Massachusetts Application May 23, 1936, Serial No. 81,471

1 Claim. (Cl. 88—52)

This invention relates to flexible wire, and with regard to certain more specific features, to flexible wire adapted particularly for use in eyeglass frames, in the temple bow portions of the temple pieces thereof.

Among the several objects of the invention may be noted the provision of flexible wire of the class described which has all the desired characteristics of flexibility, resiliency, smooth surface and the like, but which at the same time is not easily corrodible, as by the perspiration of the wearer of the eyeglasses. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawing, in which is illustrated one of various possible embodiments of the invention, Fig. 1 is a side elevation of a temple piece of an eyeglass frame;

Similar reference characters indicate corresponding parts throughout the several views of the drawing.

Figure 1:
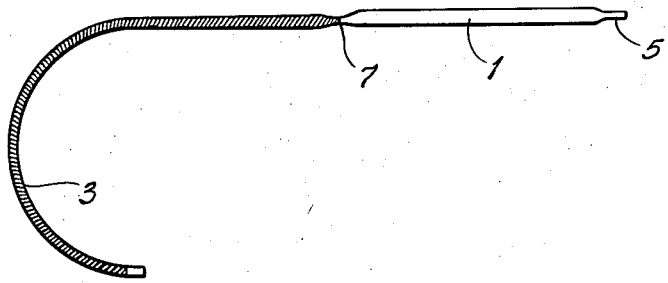

Referring now more particularly to Fig. 1, there is illustrated a temple piece for eyeglass frames. This temple piece is used by attaching it to the lens frames and, when the eyeglasses are used, it passes along the temples of the wearer and hooks behind the ears, to hold the eyeglasses in place. The temple piece shown in Fig. 1 is of a style now in wide usage, comprising a stiff, solid piece known as the temple butt, indicated by numeral 1, and a relatively soft, spring assembly of pieces which are pre-shaped to curve behind the wearer's ears and hold the eyeglasses with the maximum amount of comfort to the wearer, indicated by numeral 3. This latter portion is usually referred to as the "temple bow". At the front end of the temple butt 1, there is provided a temple joint 5 by which the temple piece is connected to the lens frame. The temple butt 1 and the temple bow 3 are joined together by a tapered welded region indicated by numeral 7.

The present invention is particularly concerned with the construction of the temple bow 3, which is made of flexible wire. It will be understood that the flexible wire of the present invention has utility outside of the field of eyeglass frames, but since this is the field in which it finds its most particular usage, it will be described more particularly with relation to said field.

Figure 2:
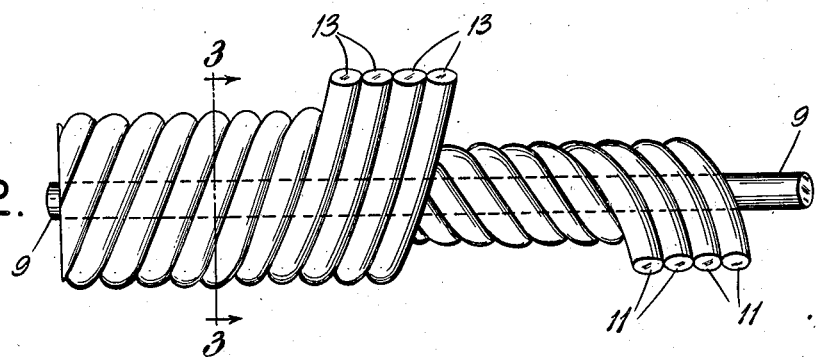
Fig. 2 is a fragmentary side elevation, greatly enlarged, of a flexible wire made in accordance with the present invention, at a preliminary stage of its manufacture.

The structure of the flexible wire of the temple bow 3 is indicated in Figure 2. It will be seen that it comprises a central core wire 9 which runs throughout the length of the temple bow 3. A series of wires 11, usually although not necessarily four in number, are wrapped in one direction about the core wire 9 in a layer of unit thickness. Then around this group of wires 11, but in the contrary direction, are wrapped another series of wires 13, likewise usually but not necessarily four in number, and in unit thickness. For example, in the embodiment shown in Fig. 2, the wires 11 are wrapped in a counter-clockwise direction while the wires 13 are wrapped in a clockwise direction.

Figure 4:
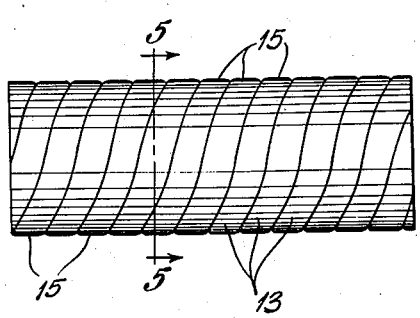
Fig. 4 is a fragmentary side elevation, greatly enlarged, of a substantially finished flexible wire made in accordance with the present invention; and, Fig. 5 is a cross section taken substantially along line 5—5 of Fig. 4.
Figure 3:
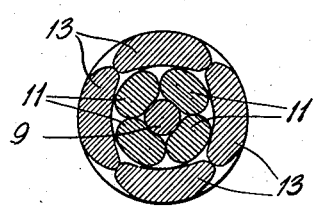
Fig. 3 is a cross section taken substantially along line 3—3 of Fig. 2.
Figure 5:
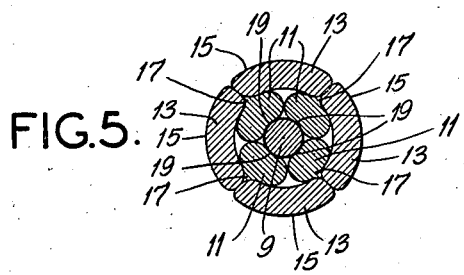

The bundle of wires thus formed is then passed through a swaging device by which two distinct operations are accomplished. In the first place, the swaging hammers or forms the outer wrapping of wires 13 into a substantially unbroken, smooth surface which provides a smooth outer texture to contact the skin of the wearer's ears. This smooth outer surface is indicated by numeral 15 in Figure 4, and from said figure, it will be seen that the lines between adjacent wires 13 are so reduced that they comprise only an almost imperceptible groove. In the second place, the swaging locks together the outer layer of wires 13, the inner layer 11 and the core wire 9, as a result of the hammering, so that the entire assembly is bonded together without becoming inflexible. The manner in which the wires are locked together is indicated somewhat diagrammatically in Figure 5. Numeral 17, for example, indicates a region on the wires 11 which is forced into the inside grooves between the adjacent wires 13, while numeral 19 indicates, for example, how the inner wires 11 are pressed into indented forms by the core wire 9. The regions 17 and 19 are to be considered as exemplary only of the highly complicated interlocking which takes place.

In order to obtain the unusually combined properties of a substantially unitary, bonded wire, and at the same time, a flexible wire, certain very limited characteristics are demanded of the inner wires 9 and 11. It has been found, for example, that the so-called "nickel-silver" wire possesses superior physical properties in regard to hardness, springiness, ease of handling, etc., over other metals and alloys. For this reason, and in spite of one very poor characteristic of this metal, it is commonly used for making flexible wire for the optical trade. Its said poor characteristic in connection with eyeglass frames is that it corrodes readily when attacked by the perspiration which commonly exudes from every person's skin.

In spite of the fact that the inner assembly of the flexible wire, comprising the wires 9 and 11, is wrapped within a tightly swaged outer wrapping comprising the wires 13, perspiration eventually finds its way through the outer layer and attacks the inner wires, and the resulting corrosion seeps back outwardly causing greenish-colored blemishes to form on the outside. This not only spoils the otherwise good appearance of the outer surface of the flexible wire, but roughens it as well, causing considerable discomfort to the wearer. In addition this corrosive action of the acids contained in the perspiration of all persons eventually eats away the inner wires 9 and 11 and weakens them to a point where they no longer have sufficient mechanical strength to properly perform the function of supporting the optical frame on the wearer's ears.

In the present invention, the inner wires of the flexible wire are made of a new alloy which has all of the desirable physical characteristics of the nickel-silver alloy heretofore used, but at the same time is corrosion proof. The alloy which has been found particularly suitable for this purpose is one composed of nickel, chromium, and iron, and usually comprises from 78% to 80% of nickel, from 12% to 14% of chromium, and from 6% to 8% of iron. An alloy having the desired characteristics is available on the market and is sold under trade-mark "Inconel".

A principal characteristic of this nickel-chromium-iron alloy which makes it suitable for use as the inner wires of flexible wire of the class herein concerned is its corrosion resistance quality. I have found that the alloy is extraordinarily resistant to the corrosion induced by human perspiration, combined with atmospheric oxidizing conditions, such as encountered in the temple bows with which the present invention is particularly concerned.

The physical qualities of this nickel-chromium-iron alloy are, for present purposes, greatly superior even to those of nickel silver. For example, the tensile strength of the nickel-chromium-iron alloy described runs from 175,000 to 200,000 pounds per square inch, while the tensile strength of nickel-silver runs from 135,000 pounds per square inch (5% nickel) to 160,000 pounds per square inch (30% nickel). The modulus of elasticity for the nickel-chromium-iron alloy described is about 31,000,000, while the modulus of elasticity for 18% nickel-silver is about 14,100,000. The modulus in torsion of the nickel-chromium-iron alloy described is about 10,300,000, which is considerably a higher figure than the corresponding figure for nickel silvers. The torsional elastic limit of the nickel-chromium-iron alloy described is about 100,000 pounds per square inch. All of these factors contribute to make the nickel-chromium-alloy described particularly suitable for use in the manner herein indicated.

The outside wires 13 are usually made of a precious metal or the like, which is non-corrodible per se, such as gold, white gold or the like. The present invention is not concerned with the composition of said outer wires 13.

It will readily be seen that while the present invention provides a flexible, non-corrodible wire of general utility, that it is most particularly applicable to the formation of ear hooks for eyeglass frames.

If desired a plurality of inner windings or layers may be provided, wound oppositely with respect to adjacent layers.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

A temple bow for eyeglass frames comprising a straight portion terminated by an ear hook, said bow being made of flexible wire, said flexible wire comprising a core wire, an inner layer of wire wrapped about said core wire in one direction, and an outer layer of wire wrapped about said inner layer in the opposite direction, said outer layer comprising a non-corrodible metal, and said core wire and said inner layer of wire comprising an alloy containing of the order of 78% to 80% nickel, 12% to 14% chromium, and 6% to 8% iron.

VICTOR D. DAVIGNON.